United States Patent [19]

Hanson et al.

[11] Patent Number: 4,512,629

[45] Date of Patent: Apr. 23, 1985

[54] OPTICAL FIBER WITH HERMETIC SEAL AND METHOD FOR MAKING SAME

[75] Inventors: Eric G. Hanson, Burlingame; Ronald Hiskes, Palo Alto; Christopher A. Schantz, Santa Clara, all of Calif.

[73] Assignee: Hewlett-Packard Company, Palo Alto, Calif.

[21] Appl. No.: 363,722

[22] Filed: Mar. 30, 1982

[51] Int. Cl.³ .............................................. G02B 5/14
[52] U.S. Cl. .................................. 350/96.30; 350/96.34
[58] Field of Search ........................ 350/96.30, 96.34; 65/3.12; 427/163

[56] References Cited

U.S. PATENT DOCUMENTS 4,173,393  11/1979  Maurer .............................. 350/96.30

Primary Examiner—William L. Sikes
Assistant Examiner—Robert E. Wise
Attorney, Agent, or Firm—John A. Frazzini

[57] ABSTRACT

A coating is applied to an optical fiber to form a thin hermetic seal. The coating is preferably applied on-line by a process such as chemical vapor deposition. The coating retains its integrity under extreme conditions of temperature and pressure thereby expanding the range of uses of optical fibers.

2 Claims, 3 Drawing Figures

FIGURE 2

| RUN | REACTANT AND CARRIER GASES (PARTIAL PRESSURE IN BARS) | COMPOSITION (±25%) (AUGER ANALYSIS) | DRAW SPEED (m/SEC) | LIFETIME IN HF | n | THICKNESS (ANGSTROMS) |
|---|---|---|---|---|---|---|
| 1 | $SiH_4 + C_3H_8 + H_2$ (.006) (.05) (.945) | $Si_{.39} O_{.10} C_{.51}$ | 1.1 | >1.5 HOURS | 47 | 200 |
| 2 | $SiH_4 + C_3H_8$ (.006) (.994) | $Si_{.20} O_{.07} C_{.73}$ | 1.1 | .4 HOURS | 189 | 160 |
| 3 | $SiH_4 + C_4H_{10} + CCl_4 + He$ (.02) (.74) (.14) (.09) | $Si_{.28} O_{.03} C_{.69}$ | 1.1 | >1.5 HOURS | 160 | 670 |
| 4 | $SiH_4 + C_3H_8$ (.006) (.994) | $Si_{.22} O_{.10} C_{.68}$ | .9 | >24 HOURS | 179 | 180 |
| 5 | $SiH_4 + C_3H_8 + N_2$ (.006) (.760) (.235) | $Si_{.22} O_{.08} C_{.70}$ | .9 | >1.5 HOURS | 185 | 190 |
| 6 | $SiH_4 + C_4H_{10}$ (.0085) (.992) | $Si_{.21} O_{.02} C_{.77}$ | 1.1 | >1 HOURS | 256 | 200 |
| 7 | $SiH_4 + C_4H_{10} + NH_3 + He$ (.008) (.83) (.083) (.075) | $Si_{.18} O_{.19} N_{.06} C_{.57}$ | 1.2 | .33 HOURS | 70 | 440 |
| 8 | $C_4H_{10}$ (1.0) | $C$ | 1.2 | 1.5 SEC | 8 | <100 |
| 9 | $SiH_4 + C_4H_{10} + NH_3 + He$ (.0008) (.76) (.17) (.07) | $Si_{.22} O_{.20} N_{.15} C_{.43}$ | 1.2 | 30 SEC | 52 | 330 |

OPTICAL FIBER WITH HERMETIC SEAL AND METHOD FOR MAKING SAME

BACKGROUND AND SUMMARY OF THE INVENTION

This invention relates in general to optical fibers and in particular to hermetic coatings for optical fibers. It is well known that bare uncoated fibers are susceptible to abrasion resulting in surface scratches. These scratches can produce a significant loss of light through the sides of the fiber and can also result in sudden failure through breakage of the fiber. Optical fibers are susceptible to breakage not only because they are formed from relatively brittle materials, but in addition the fibers typically have very small diameters and are subjected to an assortment of stresses such as bending stresses and tensile stresses. These stresses tend to open cracks or scratches thereby focussing the strain onto the chemical bonds at the tip of the crack. This results in growth of the scratch or crack eventually resulting in sudden failure of the fiber through breakage. It has therefore become standard to protect an optical fiber from abrasions by coating it with an abrasion resistant substance such as silicone. This abrasion resistant coating is typically applied on-line as the optical fiber is drawn so that surface abrasion is avoided during the pulling process.

It has more recently been recognized that optical fibers are also susceptible to corrosion. Various chemicals, including water, can react with a fiber damaging its optional properties and weakening its mechanical strength and static fatigue resistance. Microcracks in a fiber surface present regions susceptible to chemical attack, especially when the fiber is under stress. Fiber stress tends to open a crack, thereby focusing the strain onto the chemical bonds at the tip of the crack. These strained bonds are more easily chemically attacked thereby enabling corrosion to extend such microcracks. Growth of microcracks weakens the strength of a fiber producing static fatigue or sudden failure.

The effect of stress corrosion on the time to failure $t_s$ of an optical fiber under static stress $\sigma_s$ at ambient temperature and humidity results in a linear variation of log $t_s$ with log $\sigma_s$:

$$\log t_s = -n \log \sigma_s + \log B + (n-2) \log S_i$$

where B is a constant for a given glass and test environment, n is the crack velocity exponent and $S_i$ is the fracture strength in an inert environment. (See, J. E. Ritter, Jr., *Fiber and Int. Optics*, 1, 387 (1978).

The crack velocity exponent n is generally a useful parameter for evaluating optical fibers. Typically, fibers having a large value of n also have a large value of $t_s$ under typical values of applied stress. In addition, a fiber having a large value of n exhibits a rapid variation of $t_s$ with $\sigma_s$. This enables a fiber having a large value of n to be tested for a reasonable test period (e.g. a few days) at a stress only slightly above that to which it will be subjected under use. If the fiber doesn't break during this test period then, because, for large n, log $t_s$ is a rapidly decreasing function of log $\sigma_s$ it is certain to last for a long time under typical use conditions. Therefore, such fibers can be easily tested for purposes of quality control.

There presently exist a variety of coatings which protect a fiber from abrasion but not from corrosion. Because such coatings do not protect a fiber from corrosion, many prior art methods attempt to reduce microcrack degradation by employing expensive techniques to reduce the number of microcracks. Additionally, the use of fibers is often restricted to low stress applications. Another approach is to apply a metallic coating to a fiber to prevent water from reaching the fiber. It has been suggested to apply a metal seal of molten tin or aluminum which form a hermetic coating when cooled. However, metals tend to form polycrystalline solids which can themselves be rapidly corroded via greatly enhanced grain boundary diffusion. The relatively open structure of the grain boundaries provide an easy path for migrating ions to reach the $SiO_2$ surface and nucleate and/or propagate cracks. Metal coats also provide an often undesirable electrical path along a fiber. In addition, many metals react with $SiO_2$ to form metal oxides. These abrasive particles of metal oxides may roughen the $SiO_2$ surface and act as stress raisers to provide easy nucleation sites for potential cracks.

Several non-metallic coatings have been utilized to produce a hermetic seal on optical fibers. For example, silicon nitride (See U.S. Pat. No. 4,028,080 entitled "Method of Treating Optical Waveguide Fibers", issued to DiVita et al on June 7, 1977) and carbon (See U.S. Pat. No. 4,183,621 entitled "Water Resistant High Strength Fibers" issued to Kao et al. on Jan. 15, 1980) have been utilized to hermetically seal optical fibers.

Unfortunately, coatings which are suitable for use at ambient conditions are not necessarily suitable for use at more extreme temperatures and/or pressures. The increasing use of optical fibers is resulting in their use under conditions not previously encountered. For example, if optical fibers are to be used in borehole logging operations (i.e., the accumulation of data from instruments lowered down the borehole of an oil well), then the fibers must function for a useful lifetime under the extreme temperatures (on the order of 200 degrees Centigrade) and pressures (on the order of 20,000 psi) which can be encountered in a typical oil well. For a fiber to be usable for 8 hours a day over a 2 year period, this requires a 4000 hour lifetime under these extreme conditions.

Cables lowered down an oil well typically are subjected to a 3% strain so that the hermetic coating must remain intact under such strains. When conventional glass fibers under 2–3% strain ($1.4-2.1-10^9$ $N/m^2$ stress) are immersed in water at the relatively mild conditions of 95 degrees Centigrade and one atmosphere pressure, static fatigue or corrosion cracking limits their useful lifetime to 3–4 days. Since the extreme pressures in an oil well force water through the abrasion resistant coating, it is important that a hermetic coating be found which remains intact for a useful lifetime when immersed in water at 200 degrees Centigrade and 0.14 $10^9$ $N/m^2$ pressure.

When optical fibers are immersed in water, the dependence of log $t_s$ on log $\sigma_s$ varies from the linear dependence exhibited in air. In FIG. 2 is shown experimental static fatigue data for a conventional optical fiber immersed in water at assorted temperatures. These data shows that the time to failure for such fibers is not only on the order of one day at $2.1$ $10^9$ $N/m^2$ stress (i.e. 3% strain), these curves also exhibit a bend in the vicinity of $2.4$ $10^9$ $N/m^2$ stress. Similar curves also result for optical fibers protected with a silicon nitride coating. At 3% strain, these fibers also break within a few days.

Ellipsometry tests of the fiber indicate that the silicon nitride coating significantly decreases in thickness during that period. Silicon nitride has therefore turned out to be unsuitable for use in the conditions encountered in borehole logging. Similarly fibers coated with carbon have also been tested. For a 300 angstrom carbon coating deposited by sputtering, the crack velocity exponent n was determined to be only 30.3 (See M. L. Stein et al., "Ion Plasma Deposition of Carbon-Indium Hermetic Coatings for Optical Fibers", *Proc. of CLEO Conference of Laser and Electrooptics*, Washington, D.C., June 10-12, 1981). For the case of a 100 angstrom coating deposited on-line by chemical vapor deposition, the value of n was only 8. These tests therefore indicate that carbon is not a suitable hermetic coating for optical fiber immersed in water.

Silicon carbide and related coatings having a range of ratios of silicon, carbon, nitrogen and oxygen have been tested while immersed in water and have proven to have lifetimes which are several orders of magnitude better than that shown for silicon nitride and carbon coatings. The range of ratios enables a coating to be selected which not only remains hermetic over a useful lifetime while immersed in water, but also matches the physical properties (e.g., bulk modulus and thermal coefficient of expansion) of the optical fiber as closely as possible while retaining hermeticity when immersed in water.

DESCRIPTION OF THE FIGURES

FIG. 2 presents experimental data on the time to failure as a function of applied stress for optical fibers immersed in water.

DESCRIPTION OF THE PREFERRED EMBODIMENT

Figure 1:
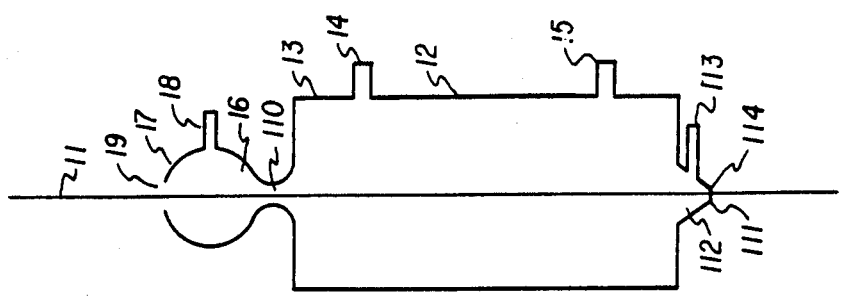
FIG. 1 shows a chemical vapor deposition apparatus for applying a coating to an optical fiber.

In FIG. 1 is shown a furnace suitable for applying on-line a hermetic seal to an optical fiber 11 by means of chemical vapor deposition (CVD). The fiber passes into a reaction chamber 12 defined by enclosing walls 13. An inlet 15 is connected to sources of reactant gases to supply reactants into chamber 12. The composition of the resulting coating is controlled by regulating the relative flow rates of the reactant gases. An exhaust port 14 is included to draw off products and unreacted reactants.

A gas seal is included at the ends of chamber 12 where fiber 11 enters and exits in order to keep ambient gases out of chamber 12 and to prevent reactant gases from escaping into the atmosphere. The gas seal where the fiber enters includes a chamber 16 defined by enclosing walls 17 through which an inlet 18 enables an inert gas to be supplied. For a CVD reaction occurring at or near ambient pressure, the reaction chamber is isolated from the ambient atmosphere by supplying through inlet 18 an inert gas such as nitrogen at slightly above ambient pressure.

The gas seal includes a pair of apertures 19 and 110 which enable optical fiber 11 to pass through the seal into chamber 12 for application of a coating in an on-line process. These apertures should be large enough that transverse motions of the fiber will not result in the fiber contacting wall 17 since such contact could scratch the fiber. Preferably, these apertures are no larger than is needed to avoid such contact so that the amount of inert gas leaking out of chamber 16 through these two apertures is as small as possible. The chamber is also sealed where optical fiber 11 exits chamber 12.

In the preferred method of applying the coating, the CVD reaction proceeds within the range 400-1700 degrees Centigrade. A thin coating of $Si_xC_yN_zO_w$ is applied to the fiber by providing reactants containing silicon, carbon, nitrogen and oxygen. For example, a thin film of silicon carbide (SiC) was applied to a 140 angstroms diameter fiber drawn at 0.6 m/s through a mixture of He, $SiH_4$, $C_3H_8$ and $N_2$ having partial pressures of 0.18, 0.02, 0.1 and 0.7 bar respectively. The crack velocity exponent which was produced for this fiber was greater than 100.

The results of other coating reactions are shown in the data table in FIG. 2. That table shows the speed at which the fiber being coated was drawn through the chamber as well as the partial pressures of the reactant gases. Samples of the coated fibers were tested to determine the resulting composition (by means of Auger analysis), thickness and crack velocity exponent of each of these coated fibers. In the column "Composition" the subscripts represent mean values of the test results; error bars are about ±25%. The integrity of these coated fibers was tested by immersing 1 meter sections of each fiber in concentrated hydrofluoric acid while applying a $1.8 \cdot 10^9$ $N/m^2$ tensile stress. Conventional uncoated fibers break in 1-10 seconds after immersion. In contrast, several of the coated fibers endured several hours or more under these conditions before breaking. The $10^3$-$10^4$ increase in duration indicates that the coatings on those fibers were free of pinholes.

The reactant ratios utilized in runs 1-7 generally resulted in optical fibers having large values of n and long lifetimes in hydrofluoric acid compared to conventional fibers. In contrast, the reactant ratios in runs 8-9 exhibited moderate or no improvement in the lifetime in hydrofluoric acid and also generally showed only moderate improvement in the value of n.

These test results show that $Si_xC_yN_zO_w$ is a suitable hermetic sealant for optical fibers for a wide range of values of x, y, z and w. However, it is well known that Si—Si, Si—O and Si—N bonds are susceptible to chemical attack, particularly in highly corrosive environments so that coatings with y essentially equal to zero are not suitable for use in borehole logging applications. Similarly, the results of run 8 as well as the test results by M. L. Stein et al cited in the background indicate that a pure carbon coating is also not suitable for borehole logging applications. The Si—C bond therefore appears to be essential to the production of a hermetic corrosion resistant coating. Two other notable effects can also be seen from the data presented in FIG. 2. First, oxygen is found in the coatings even when no oxygen is introduced via any of the reactants. Conceivably, some of the oxygen results from oxygen which is adsorbed to the surface of the fiber as it enters the CVD coating apparatus, but it is more likely that the oxygen comes from the $SiO_2$ fiber itself so that some oxygen will occur in the coating regardless of the choice of reactants and partial pressures of reactants. Second, runs 2, 4, 6 and 8 show that the inclusion of only a small percentage (0.6-2%) of $SiH_4$ results in from 21-28% silicon in the coating. The addition of such small amounts of $SiH_4$ also markedly increases the thickness of the resulting coating.

Testing of coated optical fibers at elevated temperatures and pressures has produced some surprising results which do not appear under less extreme conditions. Because of this, many of the results and techniques developed for testing fibers in air at various humidities are not applicable to fibers immersed in water at high T and p. for example, since coated optical fibers in air typically exhibit a linear relation between log $t_s$ and log $\sigma_s$, the crack velocity coefficient n can be determined by a dynamic fatigue test in which 2 samples of the fiber are stretched until broken by a stress which increases with time. Each of these 2 samples has an applied stress which increases at different constant rates so that the break occurs at 2 different times and stresses. These two distinct points are then used to calculate n as minus the slope of log $t_s$ as a function of log $\sigma_s$. The linear curve through these 2 data points is then used to predict lifetimes corresponding to other applied stresses.

Figure 3:
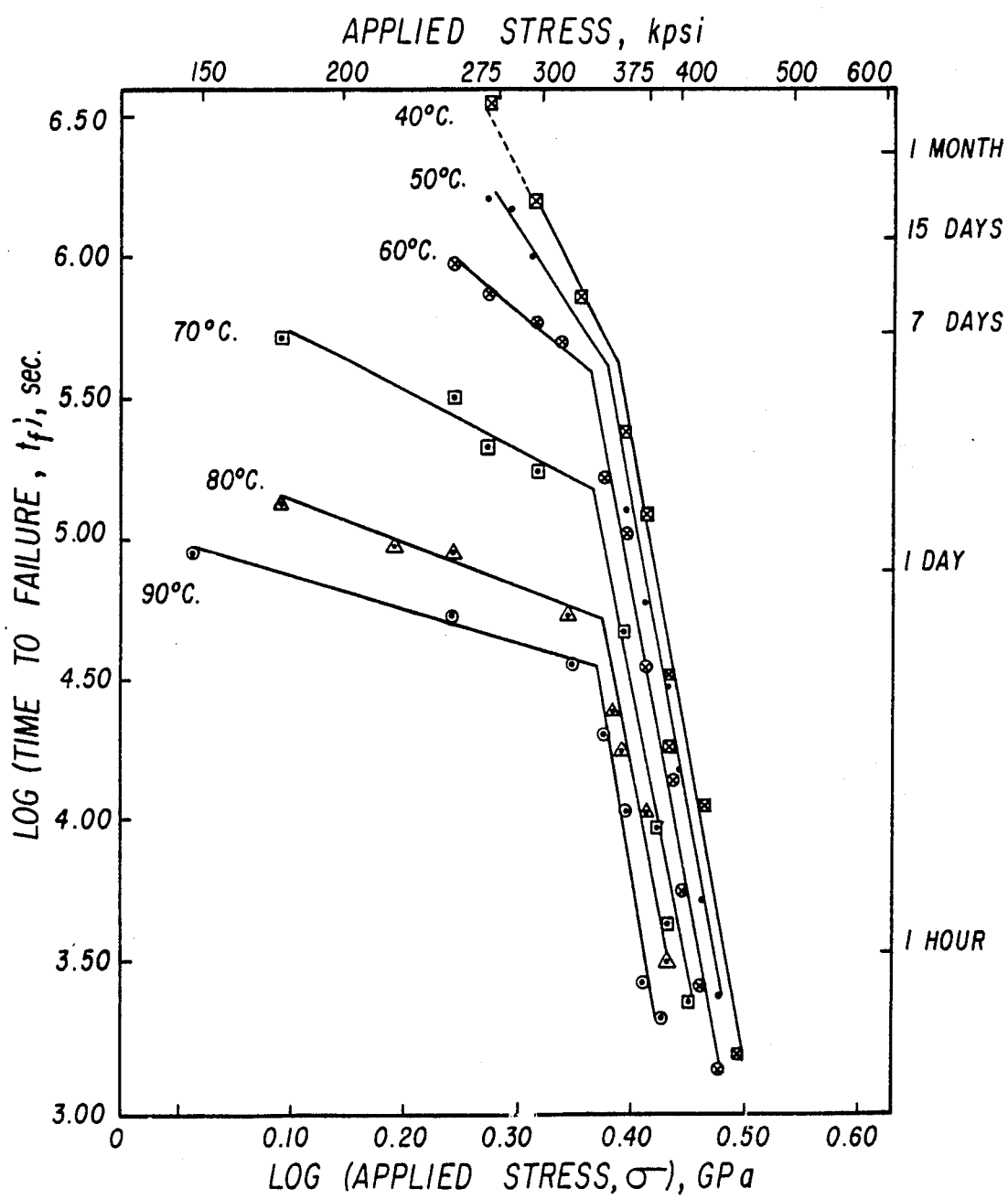
FIG. 3 shows the non-linear curves of log $t_s$ versus log $\sigma_s$ for uncoated optical fiber immersed in water at various temperatures.

Unfortunately, for optical fibers immersed in water at elevated temperatures, the curves are not linear but instead typically exhibit a pair of roughly linear regions with a bend in between (See FIG. 3). Since dynamic fatigue tests generally take place in times on the order of minutes, such data points lie on the linear parts of the curves in the lower right portion of FIG. 3. The value of n determined from these tests is therefore not useful for predicting the fiber behavior at the lifetimes of interest (i.e. on the order of 8 months). Similar curves result for many coated fibers so that accurate testing now requires static tests in which a range of constant stresses are applied to fiber samples until the samples break. Unfortunately, this requires that fibers utilizing new protective coatings be static fatigue tested for times extending up to the lifetimes of interest so that such testing can be very time consuming, thereby slowing down progress in locating useful coatings under extreme conditions. Because of the bend in the curves, values of n determined by tests taking place over shorter convenient test periods (on the order of hours or days) are no longer accurate predictors of long lifetimes but are still useful as a rough indicator whether a given coated fiber will have a longer lifetime than another coated fiber.

The usefulness of n as a sole indicator of lifetime is also reduced by recent observations of the strengths and lifetimes of coated optical fibers. It is observed that many coated fibers exhibit reduced strength under high stress conditions. It is speculated that the coating which is thin compared to the fiber diameter will rupture at high stress before the uncoated fiber itself would break at that stress. It is suggested that when the coating ruptures that, because of its adhesion to the fiber, the fiber surface is "scratched" at the point of rupture so that the fiber quickly breaks at such a point. As a result of this, if the coating is thin enough that parts of the fiber are coated and other parts aren't then at high stresses the fiber will almost always break in a section where the fiber is coated. Therefore, high stress breaks only yield data related to sections of the fiber which are coated but don't indicate whether there are gaps in the coating.

Since the uncoated sections are more susceptible to corrosion than the coated sections, the presence of uncoated sections will strongly limit lifetimes long enough for corrosion to be a dominant factor. Gaps in the coating are not uncommon for coatings less than 100 angstroms thick because the coating initially deposits in disjoint islands of growth. These gaps between such islands fill in only after a sufficiently thick coating is applied. Since values of n determined through short duration tests do not indicate whether such gaps are present, another test is needed which can be performed in a reasonable test period (on the order of a few days) and which will indicate whether such gaps exist. One test which has been found to be useful is to immerse a coated fiber in concentrated hydrofluoric acids. If any gaps in the coating exist then the fiber will break within several seconds. For example, the hydrofluoric acid test data for runs 1-7 in FIG. 2 show several orders of magnitude improvement over uncoated fibers as well as the fibers in runs 8-10. Therefore the fibers in runs 1-7 show a significant improvement over existing fibers.

Because of the difficulty in precisely defining the boundary between the fiber and the coating on the fiber, the fiber of run 8 is shown as having a coating of less than 100 angstroms whereas in fact the actual coating might be substantially less than 100 angstroms. Thus, part of the poor performance of the carbon coating in run 8 is likely to be due to the thinness of the coating. Thus, the poor results for the fiber in run 8 even in contrast to the results by Gulf and Western discussed in the Background indicates that the application of carbon to a fiber for hermetic sealing is particularly unsuitable when it is to be applied by a CVD process.

Inspection of the other test runs indicates that the stoichiometric ratio of silicon to carbon in the resulting coatings is much higher than their ratio in the reactant gases in the CVD chamber. For example, in run 4 the C:Si ratio in the reactant gases is about 500:1 whereas the ratio in the resulting coating is only about 3:1. This result seems to indicate a relative difficulty of pulling a carbon atom from a hydrocarbon reactant molecule compared to pulling a silicon atom from a silane (SiH$_4$) reactant molecule. The resulting coating thickness has thus been found to be a sensitive function of the chemistry of the reactants. It was found that methane and ethane reactants do not yield sufficiently thick coatings when supplied to the CVD reaction chamber along with silane. The longer hydrocarbon chains have been found to interact with silane to produce superior coatings on the fibers. Unfortunately, the hydrocarbons which are longer than butane are not gases at room temperature and therefore would require extra process equipment to vaporize such reactants if used in a CVD process. Therefore, propane and butane have been found to be the most suitable for use in a low cost coating process.

Comparison of run 8 with the other runs shows that the silicon atoms not only deposits more readily than the carbon atoms, the presence of the silane increases the rate at which carbons deposit. Therefore, the Si-C bonds not only appear to be important for the production of a corrosion resistant coat, the silicon also functions to speed up deposition.

The data in FIG. 1 indicate that the optimal coatings have a C:Si ratio in the reactant gases greater than 150:1. For ratios above 500:1 the ratio has a less important effect on the storchiometric ratio of C:Si in the resulting coating than it has on the deposition rate.

From the data in FIG. 2 it is apparent that the superior coatings contain at least 50% carbon, contains no more than 25% oxygen and nitrogen, and contains at least 18% silicon. The coating should also be at least 100 angstroms thick for adequate coverage of the fiber. The preferred processes utilize propane or butane along with a source of silicon. SiH$_4$ is used in the tests presented in FIG. 2 and is preferred but other silicon sources such as $SiCl_4$ and other silanes in which one or more hydrogens are replaced by organic radicals can be used. Similarly, other carbon sources such as $CCl_4$ and acetylene can be used in the CVC process. Although the Si—C bond appears more important than the bonds to oxygen and nitrogen for purposes of corrosion resistance, the inclusion of some oxygen and nitrogen in the coating is useful for more closely matching the physical properties such as breaking strength, thermal coefficient of expansion and lattice spacing so that the coating will bond strongly to the fiber and will have a reduced amount of intrinsic strain as the coating and fiber cool from the deposition temperature to ambient temperature. The reduction of this intrinsic stress reduces the risk of cracking or rupture of the coating.

We claim:

1. An improved optical fiber having an encapsulating hermetic coating consisting essentially of silicon and carbon.

2. A process for producing an optical fiber having improved resistance to static fatigue, said process comprising the steps of:
   supplying a source consisting essentially of carbon to a chemical vapor deposition reaction chamber;
   supplying a source consisting essentially of silicon to the reaction chamber; and
   pulling the fiber through the chamber while the silicon and carbon are present as vapor in the chamber.

* * * * *

UNITED STATES PATENT AND TRADEMARK OFFICE
CERTIFICATE OF CORRECTION

PATENT NO. : 4,512,629

DATED : 4/23/85

INVENTOR(S) : Eric G. Hanson, Ronald Hiskes, and Christopher A. Schantz

It is certified that error appears in the above—identified patent and that said Letters Patent is hereby corrected as shown below:

Column 5, Line 15 - before "points" insert -- data --

Column 7, Line 6 - "CVC" should read -- CVD --

Signed and Sealed this

Twenty-seventh Day of August 1985

[SEAL]

Attest:

DONALD J. QUIGG

Attesting Officer     Acting Commissioner of Patents and Trademarks